Oct. 11, 1932.   F. H. OWENS   1,881,904
LAP DISSOLVER FOR MOTION PICTURE CAMERAS
Filed Dec. 4, 1928
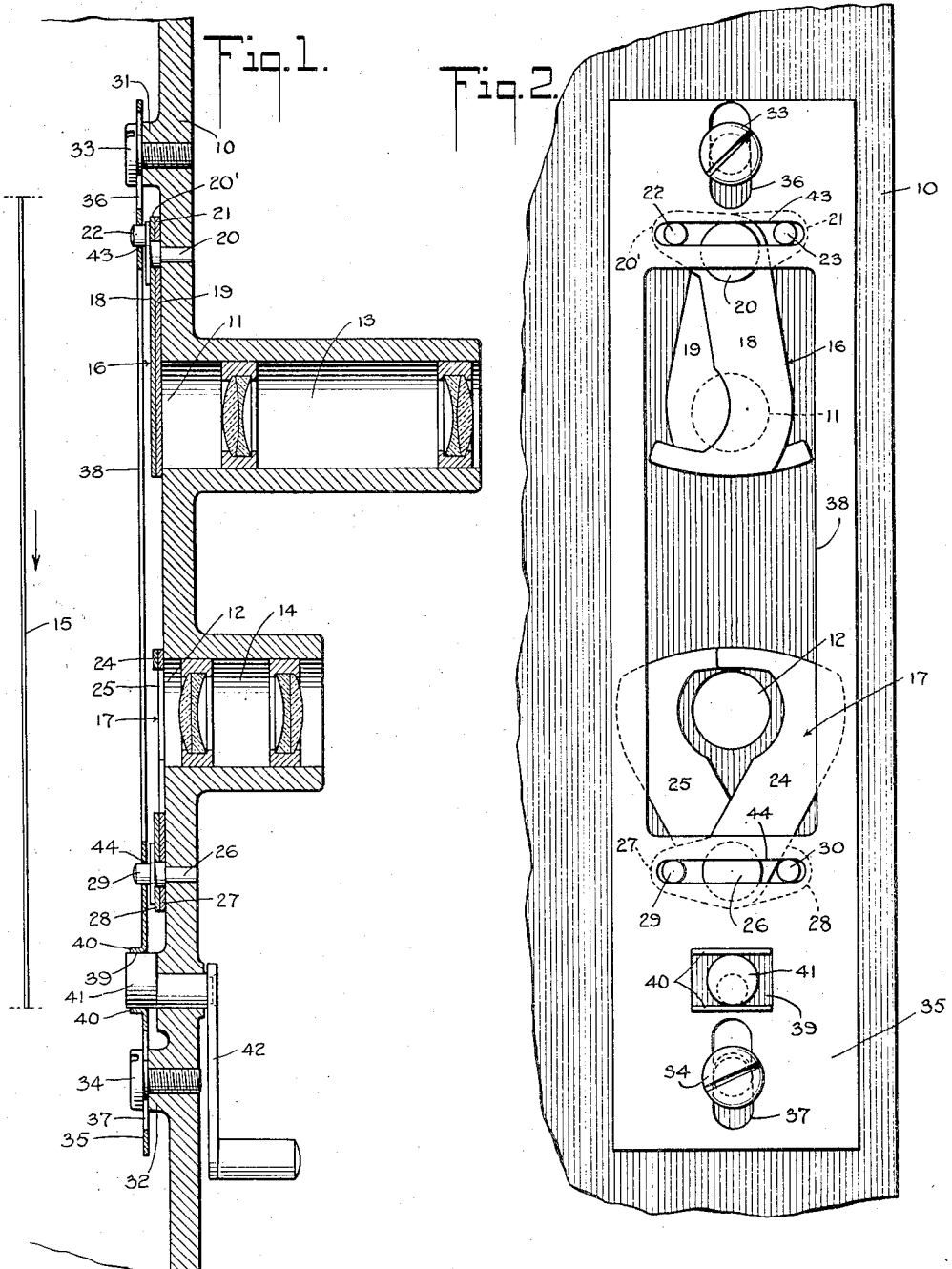
INVENTOR
Freeman H. Owens
BY
ATTORNEYS Patented Oct. 11, 1932

1,881,904

UNITED STATES PATENT OFFICE

FREEMAN H. OWENS, OF NEW YORK, N. Y.

LAP DISSOLVER FOR MOTION PICTURE CAMERAS

Application filed December 4, 1928. Serial No. 323,634.

In the projection of motion pictures it has been found desirable in changing from one scene to another, gradually to merge the following scene into the preceding scene so that as one scene fades out the other scene is gradually substituted. This process is known as a "dissolving" process This dissolving phenomenon is usually effected by varying the size of the diaphragm opening in the camera while exposing the first and last portions of a series of views. That is, while exposing the latter portion of one series of views the diaphragm is gradually closed and while exposing the first portion of the succeeding series of views the diaphragm is gradually opened. Then in printing the positives the two series of views are overlapped by printing the first portion of the second series over the latter portion of the first series.

The present invention relates to an apparatus which aims to simplify the process of obtaining this dissolving phenomenon.

The main object of the present invention is to provide a motion picture camera which will produce this dissolving phenomenon directly upon the negative, so that in producing the positives therefrom it will not be necessary to cut up the negative and to do any overlapping.

To accomplish the above purpose the present invention contemplates a camera having two lenses such as a long focus lens and a short focus lens, the camera being so designed and constructed that the negative film upon which the exposures are made moves past both lenses successively. The camera may then be used for subjecting the film to two series of views and exposures in succession as for example, in one series of distant views or exposures and to another series of close ups The dissolving effect is produced directly upon the negative by subjecting the latter portion of the first series and the first portion of the second series to double exposures, one from each of the lenses. This is preferably accomplished by providing the camera, in addition to the customary shutter associated with each lens, an additional shutter for each lens; these additional shutters being so designed and constructed that they are operable simultaneously and relatively inversely by one and the same operating means. When the film is subjected to one series of exposures, one of said shutters is opened, while the other is closed. When the end of the series is approached and it becomes necessary to commence another series of exposures through the other lens, the auxiliary shutters are operated so that the first shutter is gradually closed while the second shutter is gradually opened until the point is reached when the first shutter is entirely closed and the second shutter is entirely opened.

During this period the last portion of the first series of exposures is subjected to a series of additional exposures through the second lens with the result that an intermediate series of double exposures are obtained which give the dissolving effect desired.

Other features of the invention will become apparent from the detailed description given below when taken in connection with the accompanying drawing which forms a part of this specification and which illustrates one embodiment of the present invention.

In the drawing:

Fig. 1 is a longitudinal sectional view of the front of the motion picture camera embodying the present invention.

Fig. 2 is a rear plan view of the same.

Referring to the drawing, 10 represents the front of a motion picture camera which is provided with the lens apertures 11 and 12 and the corresponding lenses 13 and 14 disposed in front of said apertures respectively. Each of said lenses is provided with the usual diaphragm (not shown). The camera is also provided with operating devices for moving the film 15 in the direction shown by the arrow past the apertures 11 and 12 successively by means of devices well known in the art and which need not be illustrated in the present application.

In the absence of the auxiliary shutters, which will be described in greater detail hereinafter, the camera may be utilized for exposing the film 15 to two series of exposures in succession of two different scenes. For example, while the lens 14 is inoperative by the closure of its diaphragm the lens 13 may have its diaphragm open and the camera may be operated to obtain a series of long distance views. When it becomes desirable to obtain a series of close ups the diaphragm of the lens 13 is closed and the diaphragm of the lens 14 is opened and a second series of exposures is obtained on the film 15.

It is the object of the present invention to provide auxiliary shutters associated with the lenses 13 and 14 and operable in such a manner that an intermediate series of double exposures, one exposure through each of the lenses 13 and 14, is obtained; this intermediate series being disposed on the film 15 between the first and second series. This intermediate series having been taken under such conditions that the amount of light entering through the lens 13 was being gradually diminished while the amount of light entering through the lens 14 was being gradually increased, the resultant effect will be that this intermediate series will produce the dissolving phenomenon sought.

Two pairs of auxiliary shutters 16, 17, are provided, the pair 16 being mounted on the rear of the front wall 10 to cooperate with the lens 13, while the pair 17 being mounted to cooperate with the lens 14. As shown, the shutter 16 comprises two cooperating leaves 18 and 19 which are pivotally mounted together on the pin 20 carried by the wall 10 of the camera and disposed above the lens 13. The main bodies of the leaves are preferably somewhat of the form of a crescent. The leaves 18 and 19 are provided with integral arms 20' and 21, carrying lugs 22 and 23 respectively.

The shutter 17 is identical in construction with the shutter 16 and also comprises a pair of leaves 24, 25, pivotally mounted on the inner face of the wall 10 at a point immediately below the lens 14 by means of the pin 26. The leaves 24 and 25 are also provided with arms 27 and 28 respectively carrying pins 29 and 30 respectively.

The inner face of the wall 10 is provided with a pair of bosses 31, 32, carrying the screws 33, 34. A slidable plate 35 is disposed between said bosses and the heads of said screws, said plate being provided with slots 36 and 37 which receive the shanks of the screws 33 and 34 and permit of a longitudinal movement of the plate 35. The plate is also provided with a rectangular opening 38 which embraces the openings 11 and 12 in the wall 10 of the camera.

The plate 35 is provided with an opening 39 having a pair of inwardly projecting walls 40. The wall 10 carries an eccentrically operable disc 41 which is disposed within the opening 39 and is rotatable by means of the crank 42 disposed on the outside of the camera. It will be seen therefore that by the rotation of the crank 42 from the position shown, through 180° the plate 35 will be moved downwardly and when the crank 42 is again moved to the position shown in the drawing, the plate will again be moved upwardly to the position shown in the drawing.

In order to convert this sliding movement of the plate 35 into an opening and closing movement of the shutters 16 and 17, the plate is provided with the horizontal slot 43 embracing the pins 22 and 23 and another horizontal slot 44 embracing the pins 29 and 30. When the plate 35 is moved downwardly from the position shown, the pins 22 and 23 will be forced outwardly from the center of the slot with the result that the leaves 18 and 19 are moved to the open position. At the same time, a downward movement of the plate 35 will cause the pins 29 and 30 to approach each other and thereby bring about the closing of the shuter 17.

It will be seen from the above that when it becomes necessary to shift from a series of exposures taken through lens 14 to another series of exposures taken through lens 13, the crank 42 is moved slowly from the position shown in the drawing through 180° so that the shutter 17 is gradually closed while the shutter 16 is being gradually opened.

During this process a series of double exposure will be formed on the film which will produce the desired dissolving phenomenon.

Having described my invention in detail and in respect to one embodiment thereof, I do not desire to be limited to such details or forms, since many changes and modifications may be made and the invention may be embodied in other forms without departing from its spirit and scope.

I claim:

1. In combination; a motion picture camera having a pair of spaced lens openings, a slidable plate mounted on said camera and having an opening in registry with said lens openings, a shutter associated with each lens opening, and mounted adjacent thereto, and interengaging means between said plate and said shutters for operating said shutters by a sliding movement of said plate.

2. In combination; a motion picture camera having a pair of spaced lens openings, a slidable plate mounted on said camera and having an opening in registry with said lens openings, a shutter associated with each lens opening, and mounted adjacent thereto, and interengaging means between said plate and said shutters for closing one shutter and opening the other shutter by a sliding movement of said plate.

3. In combination; a motion picture camera having a front wall, two lens apertures, and a lap dissolve device carried by said camera and comprising a pair of pivoted cooperating shutter leaves for each of said lenses, each leaf having an integral arm, a lug on each of said arms, and a slidable plate having a slot for each pair of lugs, whereby operation of said plate will close one of said pair of shutter leaves and open the other pair.

4. In combination, a motion picture camera having a pair of spaced lens openings, a short focus lens in one of said openings, a long focus lens in the other of said openings, a slidable plate member mounted on said camera and having an opening in registry with said lens openings, a shutter associated with each lens opening, interengaging means between said plate member and said shutters for operating said shutters by a sliding movement of said plate, one shutter being openable simultaneously with the closing of the other shutter, and means having a crank arm arranged exterior to the camera for operating said slidable plate member.

5. In combination, a motion picture camera having a front wall, two lens apertures, a long focus lens for one aperture, a short focus lens for the other aperture, a lap dissolve device carried by said camera and comprising a pair of pivoted cooperating shutter leaves for each of said lenses, each leaf having an integral arm, a lug on each of said arms, and a slidable plate having an opening in registry with said lens openings and having a slot for each pair of lugs whereby operation of said plate will close one of said pair of shutter leaves and open the other pair, and means including a part arranged exterior to the camera for operating said slidable plate.

Signed at New York, in the county of New York and State of New York this 3rd day of Dec. A. D. 1928.

FREEMAN H. OWENS.